SELECTIVE RINGING DECODER SYSTEM

Filed March 16, 1959 3 Sheets-Sheet 1

INVENTORS
James D. Malone &
BY Arthur J. Runft
Paul J. Ellington
ATTORNEY

SELECTIVE RINGING DECODER SYSTEM

Filed March 16, 1959

INVENTORS
James D. Malone &
BY Arthur J. Runft
Paul J. Ethington
ATTORNEY

Feb. 12, 1963 J. D. MALONE ET AL 3,077,577

SELECTIVE RINGING DECODER SYSTEM

Filed March 16, 1959 3 Sheets-Sheet 3

INVENTORS
James D. Malone &
BY Arthur J. Runft
Paul J. Ehrington
ATTORNEY

United States Patent Office 3,077,577

Patented Feb. 12, 1963

3,077,577
SELECTIVE RINGING DECODER SYSTEM

James D. Malone, Milwaukee, and Arthur J. Runft, Thiensville, Wis., assignors to General Motors Corporation, Detroit, Mich., a corporation of Delaware Filed Mar. 16, 1959, Ser. No. 799,650
13 Claims. (Cl. 340—164)

This invention relates to selective signaling systems and more particularly to a selective ringing decoder system responsive to a predetermined call signal.

In communications and control systems with multiple receiving stations, it is a usual practice to utilize common circuits or carrier frequencies for all stations and to employ distinctive call signals for selecting a particular station. In a conventional system, the call signals, much like the well known dial telephone numbers, are represented by different permutations of a group of integers, such as 2 through 10. Typically, a call signal is formed by taking five integers at a time, such as 5—2—7—8—3, to permit a very large number of stations to be selectively operated in the same network.

For transmission, the call signals are encoded by sucsively alternating an electrical signal between two given frequencies with a number of alternations or transitions corresponding to the value of the call signal integer and with a prolonged delay or space bewteen alternations to separate the integer signals. In both wired circuit networks and radio networks, the call signal is encoded by alternate 600 c.p.s. and 1500 c.p.s. tone frequencies with a frequency transition at approximately every 100 milliseconds within an integer signal and a space of approximately 500 milliseconds between successive integer signals. At the receiving station, the call signals are decoded by an electromechanical decoding or selector device responsive to successive trains of electrical pulses, each train corresponding to an integer signal.

Heretofore, the decoder systems have employed an electromechanical pulse forming device which translates each tone alternation into a pulse to develop a single channel of pulse trains. Such translation is typically accomplished by a polarized relay with a heavy magnetic circuit and electrical switching contacts which are operated through many cycles for every call signal in the network. The pulse trains developed by the relay are applied to an electromechanical pulse decoder of the type wherein each pulse is translated to step-by-step displacement of a control device, such as a code wheel with ratchet teeth in which the assigned call signal is established by code pins spaced by a number of steps equal to the corresponding integer signal. An electromagnet energized by the pulses includes a fast-acting armature for actuating a driving pawl which coacts with ratchet teeth on the code wheel to advance it one step for each pulse and the electromagnet includes a magnetic time delay armature for actuating a holding pawl which retains the wheel in its advanced position during and after a correct pulse train. Such a time delay is usually accomplished by the use of a heavy copper slug on the electromagnet core to limit the rate of decay of flux and thereby delay the release of the armature. Such an arrangement is designed for a constant time delay and so the response of the decoder is limited to a narrow range of pulse repetition rate. The prior art decoder systems are expensive to manufacture and service and are not well adapted for many applications, particularly mobile radio receivers, because the complex mechanism is heavy and requires excessive space.

Accordingly, it is an object of this invention to provide an improved decoder system which is especially adapted for mobile radio-telephone service and is compatible with the conventional alternate tone signal integer type selective signaling system and which retains the advantages of the code wheel type decoder. In accordance with this invention, the tone frequency alternations of the transmitted call signal are translated electronically into a stepping or integer signal pulse train in one channel and a synchronized decoder pulse train in another channel. For this purpose, a frequency selective circuit responsive to the tone frequency alternations develops a control voltage for a trigger generator which controls a pulse generator for producing a train of integer signal pulses for the stepping actuator. The pulse trains are also applied to a decoding control circuit which produces a continuous decoding pulse extending throughout each integer signal and which are applied to a decoder actuator.

A salient feature of the invention is the use of a bistable multivibrator as the trigger generator and a monostable multivibrator coupled therewith as the pulse generator. A control signal for the bistable multivibrator, corresponding to the received tone frequency alternations, is developed from simple frequency selective circuits and by using a current detector between the frequency selective circuits and the multivibrator, an optimum impedance match is realized.

A positive latching action in the bistable multivibrator causes it to remain in its last stable state when the signal is removed so that no spurious trigger pulses are developed due to signal fading or interruption. For use in a frequency modulation receiver, spurious response to noise bursts is avoided by correlating the sensitivity to the 600 c.p.s. and 1500 c.p.s. tones with the de-emphasis network in the audio section in the receiver. By use of a monostable multivibrator for the pulse generator, the stepping or integer pulse trains are produced with individual pulses of uniform duration regardless of the variations in tone frequency alternation rate at the transmitter. A synchronized pulse train for the decoding generator is generated by a control circuit which is actuated by each individual stepping pulse. By this arrangement, the decoder system accepts call signals of wide variation in rate of tone frequency alternation and produces a pulse train of uniform pulse width.

The decoder circuit utilizes transistors operated in switching modes in the control circuits, as well as in the multivibrators, with the consequent advantages of ruggedness, small size and low power requirements. Additionally, the need for mechanical switch contacts is eliminated. Thus there is achieved a compact, light weight decoder system especially adapted for radiotelephone service in aircraft and automobiles and which is inexpensive to manufacture and maintain.

A more complete understanding of this invention may be had from the detailed description which follows taken from the accompanying drawings in which.

Figure 1:
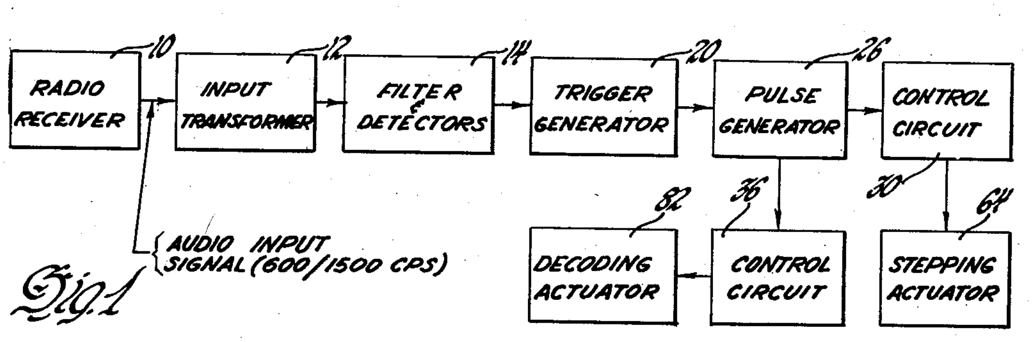
FIGURE 1 is a block diagram of the decoder system connected in a radio network.

Referring now to the drawings, there is shown an illustrative embodiment of the invention in a decoder system adapted to receive call signals in the form of tone frequency alternations and to translate the call signals to pulse form for driving an electromechanical decoding device. It will be appreciated as the description proceeds that the invention is equally applicable to either radio or wired circuit networks wherein the call signal is transmitted as successive frequency alternations between any two frequency values.

In the illustrative embodiment, a radio receiver 10, suitably a frequency modulation receiver, is tunable to a carrier wave frequency common to other receivers with similar decoder systems in the same network. To alert the operator of the radio receiver to a forthcoming message transmission, the network utilizes selective ringing wherein each receiver is assigned a call signal represented by a permutation of integers. For simplifying the explanation, it will be assumed that the call signal assigned to this particular receiver is represented by a group of three integers 4—3—4 although the number of integers taken at a time may vary, depending upon the number of receiver stations to be employed in the network. For example, it is a common practice to form the call signals by taking five integers at a time from the group of 2 through 10 in which case the number of usable permutations and hence the number of receiver stations in the same network which may be selectively called exceeds 50,000. In such systems, the integer 1 is reserved for use as a clearing signal whereby all of the decoder systems in the network are reset after each call signal transmission for reception of a succeeding call signal. The transmitter station in such a network may be of conventional type and the call signal is encoded for transmission by modulating the carrier wave with a succession of tone frequency alternations, conventionally 600 c.p.s. and 1500 c.p.s. with a number of tone alternations or transitions corresponding to the value of the particular integer in the call signal.

Figure 2:
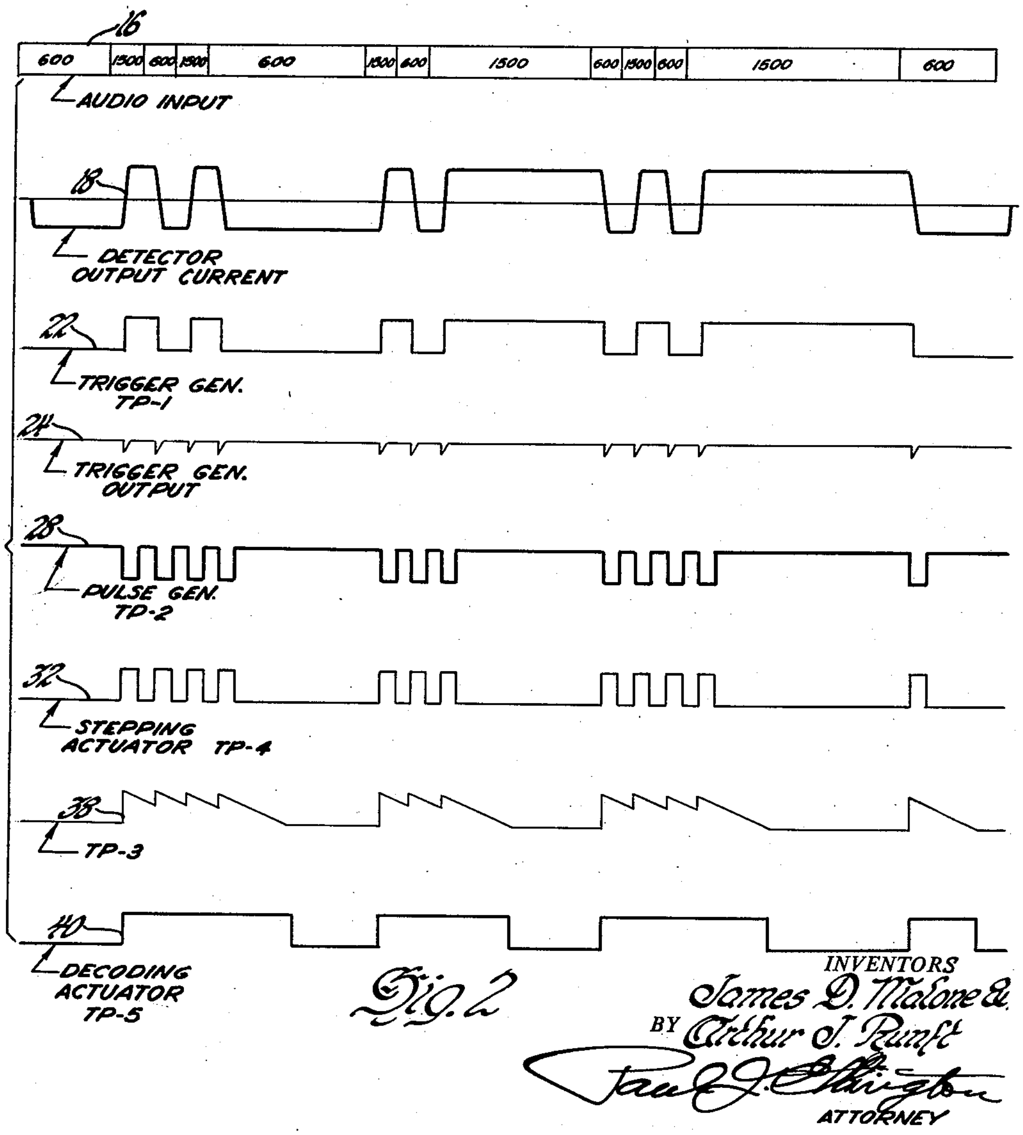
FIGURE 2 is a graphical representation of the electrical signals at selected points in the system.

During the reception of a call signal, the audio output voltage of the receiver 10 alternates between the 600 c.p.s. and the 1500 c.p.s. tones as shown in the block diagram 16 of FIGURE 2. In the call signal, which is illustrated as 4—3—4, the tone frequency within each integer signal changes about every 100 milliseconds and the pause or space between integer signals is about 500 milliseconds. The tone voltage is applied through an input stage or transformer 12 to a frequency selective detector stage 14 which develops an output current of one polarity when the 600 cycle tone predominates and of the other polarity when the 1500 cycle tone predominates and thus, as shown in waveform 18, a polarity change occurs at each tone frequency transition. The detector signal is applied to a trigger generator 20 which develops a voltage of rectangular waveform 22 between adjacent tone frequency transitions from which is developed trigger pulses having a waveform 24 and corresponding to each tone frequency transition. The trigger pulses are applied to a pulse generator 26 which develops a pulse corresponding to each trigger pulse to produce a pulse train, represented by waveform 28, for each integer signal. The integer signal pulse trains are applied to a control circuit 30 which develops corresponding driving pulses of waveform 32 which are applied to a stepping actuator 64 of a decoding device. The integer signal pulse train from the pulse generator is also applied to a control circuit 36. This control circuit develops an intermediate voltage of sawtooth waveform 38 from which decoding pulses of rectangular waveform 40 are derived and which extend throughout each integer signal for energizing a decoding actuator 82 of the decoding device.

The decoding device is of the type illustrated in FIGURE 3 which will be described briefly herein to facilitate understanding of the present invention. The decoder device per se is described and claimed in a copending application Serial No. 799,524, filed March 16, 1959, by Herbert M. Penningroth for "Decoder Mechanism" and assigned to the assignee of the present invention.

The decoding device is responsive to correlated integer signal pulse trains and decoder pulse trains, applied through separate channels, to control the energization of a signal device 44, such as a bell or a lamp. The decoding device comprises a support plate 46 upon which a code wheel 48 is mounted for rotation about a code wheel shaft 50. The code wheel is provided with a plurality of equally spaced peripheral teeth and is resiliently constrained toward a reference position by a suitable bias spring, not shown. The call signal assigned to the particular receiving station, such as 4—3—4, is set into the code wheel by code pins 52, 54, and 56 for the respective integers. The code pins extend radially from a hub 58 to a selected tooth and thence extend axially through an aperture adjacent the tooth and project beyond the other side of the code wheel. To establish the assigned call signal, the first code pin 52 is positioned four teeth in advance of a reference tooth 60, the succeeding code pin 54 is positioned three teeth in advance of code pin 52, and the final code pin 56 is positioned four teeth in advance of code pin 54. The final code pin 56 is provided with an axially extending electrical contact 62 which constitutes one of the ringing contacts for energizing the signal device 44 when the correct call signal is received.

For advancing the code wheel 48 from its reference position, in accordance with the incoming call signal, there is provided a stepping actuator or relay 64. The stepping relay comprises an electromagnet with an energizing coil 66 having one terminal connected to ground and the other terminal connected with a source of transmitted integer signal pulses. An armature 68 of U-shaped configuration is supported by a pivot pin 70 and is resiliently urged away from the electromagnet core by a leaf spring 72. The armature 68 pivotally supports a driving pawl 74 having an upturned end 76 urged toward engagement with the adjacent tooth of the code wheel by a leaf spring 78 mounted on the support plate. When the coil 66 is energized by a pulse, the armature 68 is attracted toward the electromagnet and pulls the pawl end 76 into engagement with the adjacent code wheel tooth with a stroke of sufficient length to advance the code wheel a distance of one tooth. Accordingly, for a first integer signal of four pulses, the code wheel 48 is advanced by the driving pawl 74 until the code pin 52 is aligned with the reference position.

In order to retain the code wheel in its advanced position between pulses of an integer signal and thereafter only when the integer signal corresponds to that of the assigned call signal, there is provided a retaining pawl 80 and a decoder actuator or relay 82. The decoder relay comprises an electromagnet secured to the support plate and having an energizing coil 84 with one terminal connected to ground and the other terminal connected to a source of decoder pulses. The relay 82 includes an armature 86 supported by a pivot pin 88 and resiliently urged away from the electromagnet core by a leaf spring 90. The armature 86 includes an actuator plate 92 with a cam surface 94. When the relay 82 is not energized and the armature 86 is dropped out as shown, the cam surface 94 engages a tab 96 on the retaining pawl 80 and disengages the pawl from the code wheel teeth. Upon the receipt of the first integer signal pulse which is applied to the stepping relay 64, a decoding pulse is simultaneously applied to the decoder relay 82. When the relay is energized, the armature 86 is pulled-in and the pawl 80 is allowed to engage the code wheel teeth so that it can ride over the adjacent tooth when the driving pawl is actuated and prevent retrograde movement of the wheel between pulses of an integer signal. At the end of an integer signal, the armature 86 drops out but its motion is arrested at an intermediate position by the engagement of a tab 98 on the actuator plate 92 with the projecting end of the code pin 52. Accordingly, the tab 98 interferes with arcuate motion of the code pin and the retaining pawl is allowed to remain aligned with the adjacent tooth to prevent retrograde motion of the code wheel.

Upon receipt of the succeeding integer signal, the actuating relay 64 and the decoder relay 82 are energized simultaneously and the succeeding pulses of the integer signal cause the driving pawl 74 to advance the code wheel step-by-step to position the code pin 54 at the reference position while actuating relay 82 allows the retaining pawl 80 to prevent retrograde motion between pulses and at the end of the signal as previously described. Similarly, the succeeding integer signal causes the code wheel to advance the code pin 56 to the reference position while the decoder pulse acting through the relay 82 prevents retrograde motion between integer pulses. At the end of this final integer signal, the armature 86 is allowed to drop out but its motion is arrested by the engagement of an electrical ringing contact arm 100 mounted on the armature with the ringing contact 62 on code pin 56. In this position of the armature, the contact arm and the retaining pawl 80 prevent retrograde motion of the code wheel. The engagement of ringing contacts 100 and 62 completes an energizing circuit from the voltage source B+ terminal through the signal device 44, the ringing contacts, and thence through the code wheel, shaft 50, and support plate 46 to the B+ return. Accordingly, when the correct call signal is applied to the decoder mechanism, the code wheel is advanced to a position where the ringing contacts are closed at the end of the last integer signal and the signal device 44 apprises the operator that the station is being called. When the call signal is completed, a clearing signal in the form of a single actuating pulse and decoding pulse is transmitted and the code wheel is advanced one tooth. Since there is no code pin at this position to retain the armature 86 in its intermediate position, it drops out completely and displaces the retaining pawl 80 from the adjacent tooth permitting the code wheel to return to its reference position in readiness for a succeeding call signal.

The decoder device will not respond to call signals other than that assigned to the particular station. If the first or any succeeding integer signal of the transmitted call signal is different from the corresponding integer of the assigned call signal, then the code wheel will be advanced to a position in which no code pin is positioned opposite the reference position and the decoding armature 86 will not be retained in its intermediate position but will fall out and permit the code wheel to return to its reference position. Provision is also made to prevent false response of the decoder mechanism to a transmitted call signal having a first integer signal which is equal to the sum of the first two integer signals of the assigned call signal. For example, in the particular decoder with an assigned call signal of 4—3—4, provision is made to prevent closing of the ringing contacts upon receipt of a call signal 7—4—8. The first integer signal of seven pulses would, without special provision, advance the code wheel until the code pin 54 is in the reference position without stopping at the first code pin 52. The next transmitted integer signal of four pulses would advance the code wheel until the code pin 56 is in the reference position and the ringing contacts would be closed. To prevent this false response, a blocking lever 102 is pivotally mounted on the actuating plate 92 and provided with an axially extending tab 104 and an arcuate cam surface 106. During an integer signal, the decoding armature 86 is pulled-in and positions the tab 104 in the path of the projecting ends of the code pins and if the transmitted integer signal corresponds with that of the assigned call signal, then the code pin will be advanced immediately adjacent the tab 104; but if the integer of the transmitted call signal is greater than that in the assigned call signal, the code pin will engage the tab 104 and displace the lever 102 counterclockwise about its pivotal support and move the cam surface 106 into the path of the driving pawl 74 and prevent its engagement with the adjacent tooth, thereby blocking further advancement of the code wheel during the integer signal. Accordingly, the code wheel will return to its reference position when the decoding armature drops out at the end of the integer signal.

Figure 4:
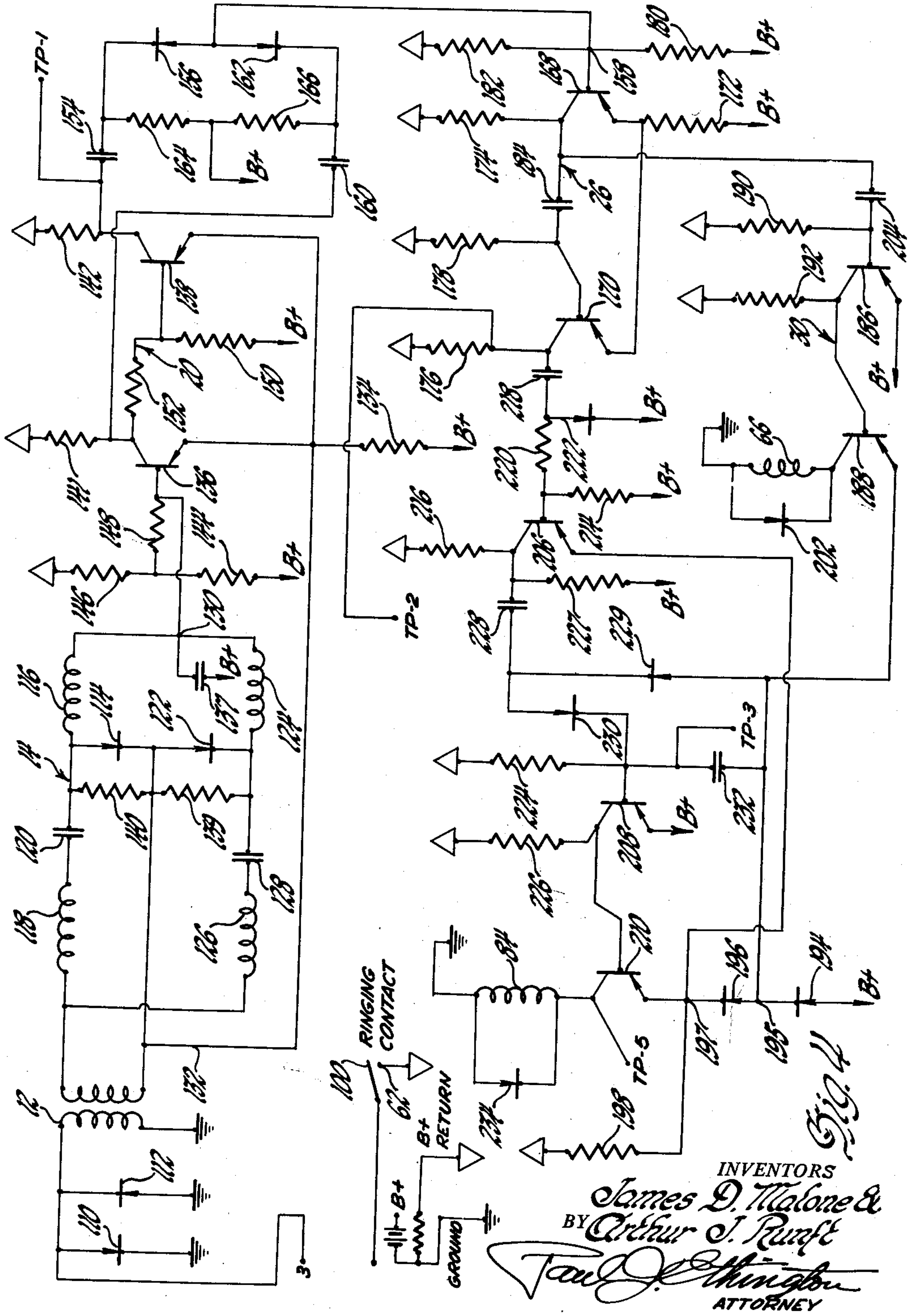
FIGURE 4 is a schematic diagram of the decoder circuit.

Referring now to FIGURE 4, there is shown a schematic diagram of the inventive circuit for translating the received alternate tone call signal 16 into integer signal pulses of waveform 32 and into decoding pulses of waveform 40, which are applied to the stepping actuator and decoding actuator respectively, of the decoder mechanism just described. The received alternate tone call signal developed by the audio frequency output stage of the receiver is applied across the input terminal 3 and ground and is limited to the desired amplitude by a pair of oppositely poled parallel silicon diodes 110 and 112 each having forward conduction threshold voltages of about 0.6 volt. The signal is applied through a coupling transformer 12 which provides impedance transformation from the relatively low impedance of the audio output stage to match the higher input impedance of the frequency selective detector stage 14. The transformer secondary is connected across a current detector including a shunt diode 114 and a series smoothing inductor 116, through a frequency selective circuit comprising an inductor 118 and condenser 120 which are series resonant at 600 c.p.s. Similarly, the transformer secondary is connected across a current detector including a shunt diode 122 and a series smoothing inductor 124 through a 1500 c.p.s. series resonant circuit including inductor 126 and condenser 128. The current detectors, through inductors 116 and 124, are connected to a common output terminal 130 which is of negative polarity when the 600 c.p.s. tone predominates and is of positive polarity when the 1500 c.p.s. tone predominates. The current detectors are provided with a return circuit through a conductor 132 which connects the transformer secondary to the emitter of a transistor 136 in the input of a bistable multivibrator in the trigger generator 20. The current detectors provide the advantage of good impedance match with the low input impedance of the multivibrator. To delay the build-up of a negative voltage from a 600 c.p.s. tone at the terminal 130, a condenser 137 is connected between the terminal and B+. Similarly, to delay the build-up of a positive voltage from a 1500 c.p.s. tone, a resistor 139 is connected across diode 122 and is effectively in shunt with the inductor 124. This delay in the output terminal voltage prevents false response to short noise bursts of either tone frequency and only the persistent voltage of an applied signal of either tone frequency will develop enough voltage to switch the multivibrator in trigger generator 20. This arrangement requires a resistor 140 to balance the current detectors which is used to further advantage in avoiding false response to noise bursts, especially in frequency modulation receivers. An FM receiver usually includes 6 db per octave de-emphasis network in the audio section to compensate for preemphasis at the transmitter and, therefore, the noise output centered about the 600 c.p.s. tone frequency will be more intense than that near the 1500 c.p.s. tone frequency. Therefore, resistor 140 is of lower value than the resistor 139 to make the output signal from the 1500 c.p.s. tone about 6 or 7 db less than the output signal from the 600 c.p.s. tone.

The trigger generator 20 is adapted to develop a trigger pulse for each tone transition of the call signal. It comprises a pair of transistors 136 and 138 connected in a bistable, emitter coupled multivibrator. The emitters of the transistors 136 and 138 are connected to the voltage source B+ terminal through the common resistor 134 and the collectors are connected respectively through resistors 141 and 142 to the B+ return. In order to provide a positive latching action to manitain the circuit in either stable state when the input signal is removed, the resistor 141 is of considerably higher value than the resistor 142. In the input circuit of the transistor 136, the base is biased positive with reference to the emitter by connection, through a resistor 148, to the junction of resistors 144 and 146 which are connected across the voltage source. In the input circuit of transistor 138, the base is coupled to the collector of transistor 136 by the resistor 152 which is connected in series with resistors 150 and 141 to form a voltage divider between the B+ terminal and the B+ return. The output terminal 130 of the detector stage is connected to the base of transistor 136 and the return circuit conductor 132 is connected to the emitter. When the 1500 cycle tone predominates, the output current of the detector stage increases the back bias on the emitter to base of transistor 136 and thus maintains the transistor at cut-off. In this condition, the forward bias on the emitter to base of transistor 138 is sufficient to maintain this transistor in full conduction. When the 600 cycle tone predominates, the detector stage output current biases the emitter to base of transistor 136 in the forward direction and conduction in the emitter-collector circuit increases. This increased conduction causes the voltage at the collector of transistor 136 to increase toward B+ and this positive-going voltage is applied through resistor 152 to the base of transistor 138 causing its emitter to collector current to decrease and the instantaneous switching of conduction from transistor 138 to transistor 136. Since the resistor 141 is larger than resistor 142, the emitter of transistor 136 is now held at a more positive voltage and sufficient emitter-to-base current flows to maintain transistor 136 in saturation. If the 600 c.p.s. tone signal should fade, the transistor 136 will remain in conduction. When the 1500 cycle tone again predominates, the detector stage output current will reversely bias the base of transistor 136 reducing conduction in its collector circuit and the negative-going collector voltage will be applied to the base of transistor 138 permitting its emitter-to-collector current to increase. This will switch conduction from the transistor 136 to transistor 138 at the occurrence of the tone transition. The output voltage of the multivibrator, taken at the collector of transistor 138 and test point TP–1, has the waveform 22 (FIGURE 2).

In order to develop trigger pulses from the multivibrator output, the collector of transistor 138 is connected through a condenser 154 and a diode 156 to the input terminal 158 of the pulse generator 26. Similarly, the collector of transistor 136 is connected through a condenser 160 and diode 162 to the input terminal of the pulse generator. The diodes 156 and 162 are poled for conduction of negative pulses only and a D.C. return path for the diodes is provided by a pair of resistors 164 and 166 connected serially thereacross with their common junction connected to the B+ terminal. The condensers 154 and 160, in conjunction with the input resistance of the pulse generator, form a differentiating circuit to develop trigger pulses, at the occurrence of each tone transition, having a waveform 24 (FIGURE 2).

The pulse generator 26 is adapted to produce a train of pulses corresponding to the successive tone frequency transitions of the call signal. The pulse generator comprises a pair of transistors 168 and 170 connected in a common emitter, monostable, multivibrator circuit. The emitters of transistors 168 and 170 are connected with the B+ terminal through the common resistor 172. The collector of transistor 168 is connected to the B+ return through a resistor 174 and the collector of transistor 170 is similarly connected through a resistor 176, of lower value than resistor 174. The base of transistor 170 is connected to the B+ return through the resistor 178 so that in the stable state, the emitter-to-base current biases the transistor 170 to full conduction. The base of transistor 168 is biased positive with reference to the emitter by the voltage divider resistors 180 and 182 connected across the voltage source so that in the stable state, transistor 168 is cut-off. The collector of transistor 168 is coupled to the base of transistor 170 through a timing condenser 184. When a trigger pulse from the trigger generator 20 is applied to the base of transistor 168, the negative potential thereof permits emitter-to-base current and hence the emitter-to-collector current in transistor 168. This produces a positive-going voltage at the collector which is applied through the condenser 184 to the base of transistor 170, reducing its emitter-to-collector current and hence the current through common resistor 172. Accordingly, the voltage at the emitter of transistor 168 becomes more positive, increasing the current from emitter to collector until the transistor 168 is fully conductive and transistor 170 is cut off. When the timing condenser 184 is charged to a predetermined value by the positive voltage at the collector of transistor 168, the base of transistor 170 will have become sufficiently negative to permit emitter-to-base current and thus the transistor 170 begins to conduct. Since the resistor 176 in the collector circuit of transistor 170 is of lesser value than resistor 174 in the collector circuit of transistor 168, the voltage at the emitters will become less positive and the conduction of transistor 168 will be cut-off and transistor 170 will become fully conductive. Accordingly, for each trigger pulse applied to the base of transistor 168, a positive pulse is developed at the collector of this transistor and a negative pulse is developed at the collector of transistor 170 and test point TP–2. The pulses are of uniform width as determined by the timing condenser 184 as shown by the waveform 28 (FIGURE 2) and preferably of about 40 milliseconds duration. The positive pulses from the pulse generator are applied to the control circuit 30 for the stepping actuator 34 and the negative pulses are applied to the control circuit 36 for the decoding actuator 42.

The control circuit 30 comprises a control transistor 186 and a switching transistor 188. The transistor 186 has its emitter connected to the B+ terminal and its base connected to the B+ return through a resistor 190 to maintain the transistor normally in saturation. The collector is connected through a resistor 192 to the B+ return. The switching transistor 188 has its collector connected to ground through the energizing coil 66 of the stepping actuator 64 and its base connected directly to the collector of transistor 186. In order to develop a bias voltage for the emitter, a pair of diodes 194 and 196 are connected with a series resistor 198 across the voltage source to form a voltage divider. The diodes, suitably of the silicon type, each develops a voltage drop in the forward direction of about 0.6 volt regardless of the amount of current to provide reference voltage terminals 195 and 197. The emitter of transistor 188 is connected to the reference voltage terminal 195 which is at slightly lower voltage than the base so that transistor 188 is normally cut-off. A diode 202 is connected across the energizing coil 66 to absorb the inverse voltage peak resulting from the collapse of the magnetic field of the coil to avoid damage to the transistor. The positive pulses of the pulse generator 26 are applied to the control circuit 30 through the coupling condenser 204. Each positive pulse is applied to the base of transistor 186 and cuts off conduction in this transistor and causes a negative-going voltage at the base of transistor 188 which turns it on and produces a current pulse through the energizing coil 66. At the end of the incoming positive pulse, transistor 186 returns to full conduction and transistor 188 is returned to cut off. Direct current restoration for the condenser 204 is provided by the emitter-to-base diode of transistor 186 so that the circuit can recover in time for the succeeding pulse. Accordingly, the train of positive pulses developed by the pulse generator causes the control circuit 30 to produce a corresponding train of pulses, represented by waveform 32, for energizing the coil 66 of the stepping actuator 64.

In order to develop a decoding pulse synchronized with each train of pulses from the pulse generator 26, the negative pulses therefrom are applied to a control or pulse stretching circuit 36 which includes a pulse inverter transistor 206, a control transistor 208, and a switching transistor 210. In the pulse inverter, the transistor 206 is held normally non-conductive by connection of its emitter to the reference voltage terminal 197 and the connection of its base to the B+ terminal through the resistor 214. The collector of transistor 206 is connected to the B+ return through the resistor 216. The negative output pulses from the pulse generator 26, taken from the collector of transistor 170, are applied through a condenser 218 and a current limiting series resistor 220 to the base of transistor 206 across a resistor 214. Each negative pulse drives transistor 206 into full conduction and produces a corresponding positive pulse at the collector. A direct current restoring circuit for the condenser 218 is provided by a diode 222 connected from the junction of condenser 218 and the resistor 220 to the B+ terminal. This restoring circuit permits discharge of condenser 218 between succeeding pulses of a closely spaced pulse train. Thus, the output of the pulse inverter is of the same wave shape and polarity as the waveform 32 of the stepping actuator pulse trains.

The control transistor 208 is normally biased to full conduction by connection of its emitter with the B+ terminal and by connection of its base to the B+ return through a resistor 224. The collector is connected to the B+ return through a resistor 226. The positive output pulses of the inverter are applied through a condenser 228 and a diode 230 to the base of the transistor 208. D.C. restoration is provided for condenser 228 by a diode 229 connected between reference voltage terminal 195 and the junction of diode 230 and the condenser. To prevent the collector voltage of transistor 206 from returning all the way to the B+ return potential and thus permit condenser 228 to have a lower voltage rating, the collector is connected to the B+ terminal through a resistor 227. Each positive pulse cuts off conduction of transistor 208 for the duration of the pulse and charges a storage condenser 232 connected between the base of transistor 208 and the reference voltage terminal 195. The charge on condenser 232 is retained between pulses of an integer signal, since the diode 230 prevents discharge, so that the voltage is sufficient to maintain the transistor 208 fully cut-off. The charge on condenser 232 will leak off through resistor 224 between pulses of succeeding integer signals, i.e. in the space between pulse trains which is about 500 milliseconds, so that transistor 208 will return to full conduction. The voltage across the condenser 232, taken at test point TP–3 with reference to B+ has the waveform 38 in FIGURE 2.

The switching transistor 210 controls the energization of the coil 84 decoding actuator 82. The transistor 210 is normally biased non-conductive by connection of its emitter with the voltage reference point 197 and by connection of its base to the collector of transistor 208 which is normally maintained at B+ potential. The collector of transistor 210 is connected to ground through the energizing coil 84 of the decoder actuator and a damping diode 234 is connected across the winding 84 for protection of the transistor. When the control transistor 208 is held non-conductive by a series of closely spaced pulses in a pulse train, which maintains a cut-off voltage on storage condenser 232, the transistor 210 becomes conductive and the coil 84 is energized. The prolonged energizing pulse for the decoder actuator has a waveform 40 and commences concurrently with the first pulse of the pulse generator and terminates about 200 milliseconds after the last pulse in each integer signal pulse train.

The operation of the overall system will be summarized by considering the reception of the assigned call signal 4—3—4 for the particular decoder system just described. As shown in the block diagram 16 of FIGURE 2, the integer signals are represented in the audio input as a series of four tone transitions followed by a series of three tone transitions, a succeeding series of four transitions and a final single transition representing the clearing pulse. Within each integer signal, the transitions are spaced at about 100 milliseconds and the integer signals are separated by a space of about 500 milliseconds. In the detector stage 14, the 600 cycle tone develops an output current of negative polarity and the 1500 cycle tone develops an output current of positive polarity represented by the waveform 18. The detector stage output controls the trigger generator 20 which includes transistors 136 and 138 connected in a bistable multivibrator. The detector output current of negative polarity switches conduction from transistor 138 to transistor 136 and the current of positive polarity switches conduction from transistor 136 to transistor 138. In the output stage of the trigger generator, the diodes 156 and 162 pass only the negative collector pulses which are differentiated to develop a trigger pulse at the occurrence of each tone transition as shown by the waveform 24. The trigger pulses are applied to the input of the pulse generator 26 which includes transistors 168 and 170 in a monostable multivibrator circuit. In the stable state of the pulse generator, transistor 170 is conductive and transistor 168 is non-conductive. Each trigger pulse switches conduction from transistor 170 to transistor 168 and after a time delay of about 40 milliseconds, as controlled by timing condenser 184, transistor 168 turns off and transistor 170 resumes conduction. A positive pulse corresponding to each tone transition is derived from the collector of the transistor 168 and is applied through a normally conductive control transistor 186 to a normally non-conductive switching transistor 188. Each positive pulse of the pulse generator thus turns off the control transistor and turns on the switching transistor to provide a driving pulse for the energizing coil 66 of the stepping actuator 34 as shown in the waveform 32.

In order to develop synchronized decoding pulses, the negative pulses, taken from the collector of transistor 170 in the pulse generator, are applied through a pulse inverter transistor 206 to a storage condenser 232. Between the successive positive pulses of an integer signal from the inverter, the condenser 232 maintains sufficient voltage to hold control transistor 208 cut off. Consequently, the switching transistor 210 is maintained fully conductive and the energizing coil 84 of the decoding actuator 42 is energized throughout the integer signal. As shown in waveform 40, the integer pulses continue beyond the last tone transition for a period of about 200 milliseconds as determined by the discharge circuit of storage condenser 232.

Figure 3:
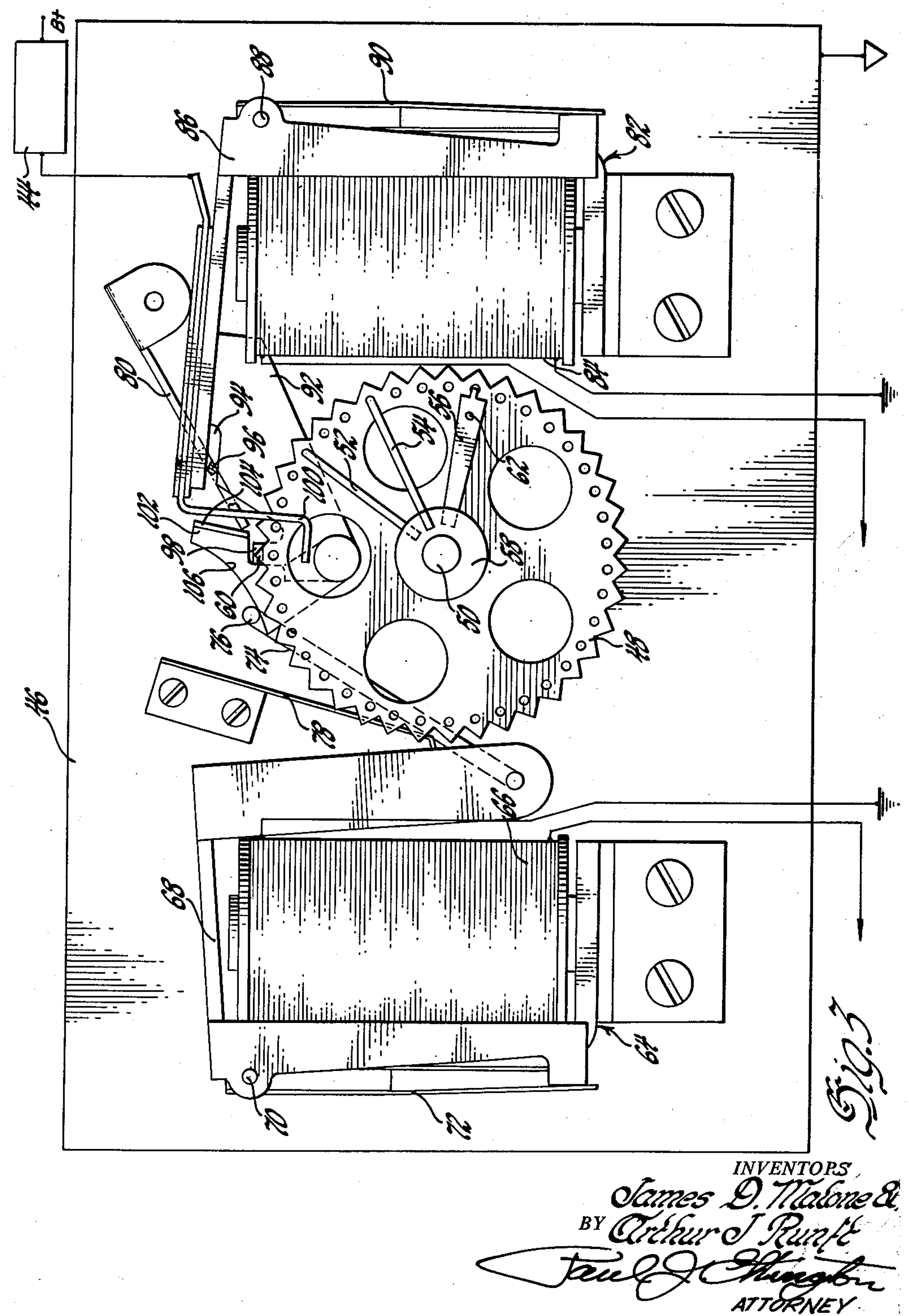
FIGURE 3 shows the decoder mechanism.

Consider now the application of the integer signal pulses of waveform 32 and the decoding pulses of waveform 40 to the decoder device of FIGURE 3. The integer signal pulses are applied to the stepping actuator 64 and the decoding pulses are applied to the decoding actuator 82 simultaneously. Consequently, both armatures 68 and 86 are pulled-in allowing the retaining pawl 80 to engage the teeth of the code wheel while the driving pawl 74 is actuated for each pulse of the integer signal and advances the wheel until the first code pin 52 is opposite the reference position. After the last pulse of the integer signal, the armature 68 and driving pawl drop out and after a time delay of about 200 milliseconds, the armature 86 drops out to an intermediate position in which tab 98 engages the end of the code pin 52 and arrests motion of the armature so that the retaining pawl remains adjacent the code wheel teeth. Thus the code wheel is held in its advanced position and upon the reception of the next integer signal, the code wheel is advanced three more steps in the same manner. Upon the receipt of the succeeding integer signal, the code wheel is advanced four more steps in which the code pin 56 is at the reference position. When the decoding actuator armature 86 drops out, the ringing contact 100 engages the ringing contact 62 and completes the energizing circuit for the signaling device 44. Finally, the clearing pulse, represented by the final tone transition, causes simultaneous actuation of the stepping actuator and the decoding actuator to advance the code wheel one more step. Upon termination of the decoding pulse, the armature 86 drops out completely since there is no code pin at the reference position and the retaining pawl 80 is displaced from the code wheel teeth and permits the code wheel to return to its reference position in readiness for reception of a succeeding call signal.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

The invention claimed is:

1. In a selective signaling system using call signals represented by permutations of a group of integers and encoded in a transmitted signal by alternating the frequency thereof with closely spaced frequency transitions to form an integer signal and remotely spaced transitions to separate successive integer signals, a receiving station including a signal device, an electromechanical decoding device having a stepping actuator and a decoding actuator, said decoding device being operative to control the signal device only when the stepping actuator is energized with successive pulse trains, each having a predetermined number of pulses and only when the decoding actuator is energized with a prolonged pulse continuing through each train of pulses, and a decoder circuit responsive to the transmitted signal and including an integer signal channel connected with the stepping actuator and developing, in response to each signal frequency transition, an electrical pulse of lesser duration than the interval between said closely spaced transitions, and including a decoding pulse channel connected with the decoding actuator, and developing in response to each signal frequency transition, a prolonged pulse of greater duration than the interval between the closely spaced transitions but of lesser duration than the interval between the remotely spaced transitions.

2. In a radio selective signaling system using call signals represented by permutations of a group of integers and transmitted as a series of tone frequency alternations for each integer signal, a receiving station including an electromechanical decoding device having a stepping actuator and a decoding actuator, said decoding device being adapted to switch a ringing circuit only when the stepping actuator is energized with successive pulse trains, each having a predetermined number of pulses and only when the decoding actuator is energized with a prolonged pulse continuing through each train of pulses, said receiving station including means developing tone frequencies corresponding to the transmitted call signal, and a decoder circuit connected between said means and the decoding device and including a stepping pulse channel connected with the stepping actuator and developing an electrical pulse for each tone frequency transition, and including a decoding pulse channel connected with the decoding actuator and developing a prolonged pulse continuing throughout each series of tone frequency alternations.

3. In a selective signaling system using call signals represented by permutations of a group of integers and transmitted as successive series of signal alternations between two frequencies with each series corresponding to an integer signal, a decoder system including a frequency selective detector adapted to receive the transmitted signal and develop an output signal of one polarity when one signal frequency predominates and of the other polarity when the other signal frequency predominates, a trigger generator having its input connected with the frequency selective detector and developing a train of trigger pulses corresponding to the successive changes of polarity, a pulse generator having its input connected with the trigger generator and generating a train of pulses corresponding to each integer signal, a pulse stretching circuit connected with the pulse generator for developing a prolonged pulse continuing through each train of pulses, and a decoding device having one input connected with the pulse generator and having another input connected with the pulse stretching circuit.

4. In a selective signaling system using call signals represented by permutations of a group of integers and encoded in a transmitted signal by alternating the frequency thereof with closely spaced transitions to form an integer signal and with remotely spaced transitions to separate successive integer signals, a receiving station including a signal device, an electromechanical decoding device having a stepping actuator and a decoding actuator, said decoding device being operative to control the signal device only when the stepping actuator is energized with a predetermined number of successive pulse trains with a predetermined number of pulses in each train and only when the decoding actuator is energized with a prolonged pulse continuing through each train of pulses, and a decoder circuit receiving the alternate frequency signal and including a pulse generator developing a pulse corresponding to each frequency transition, an integer signal channel connected between the pulse generator and the stepping actuator, and a decoding pulse channel connected between the pulse generator and the decoding actuator and developing a prolonged pulse continuing throughout each integer signal.

5. In a selective signaling system using call signals represented by permutations of a group of integers and encoded in a transmitted signal by alternating the frequency thereof between first and second frequencies with closely spaced transitions to form an integer signal and with remotely spaced transitions to separate successive integer signals, a receiving station including a signal device, an electromechanical decoding device having a stepping actuator and a decoding actuator, said decoding device being operative to control the signal device only when the stepping actuator is energized with a predetermined number of successive pulse trains with a predetermined number of pulses in each train and only when the decoding actuator is energized with a prolonged pulse continuing through each train of pulses, and a decoder circuit including a frequency selective detector adapted to receive the alternate frequency signal and develop an output signal of one polarity during reception of the first frequency and of the other polarity during reception of the second frequency, a bistable multivibrator coupled with the detector output and switching from one stable state to the other when the polarity of the applied signal changes, a trigger pulse forming circuit connected with the output of the multivibrator to develop a trigger pulse for each frequency transition, a pulse generator connected with the output of the pulse forming circuit and developing a driving pulse corresponding to each frequency transition, an integer signal channel connected between the pulse generator and the stepping actuator, and a decoding pulse channel connected between the pulse generator and the decoding actuator and developing a prolonged pulse continuing throughout each integer signal.

6. In a selective signaling system using call signals represented by permutations of a group of integers and encoded in a transmitted signal by alternating the frequency thereof between first and second frequencies with closely spaced transitions to form an integer signal and with remotely spaced transitions to separate successive integer signals, a receiving station including a decoder circuit for translating said frequency transitions into electrical pulses, said decoder circuit including an impedance device adapted to receive the alternate frequency signal and develop a signal voltage corresponding thereto, first and second current detectors, first and second series resonant circuits tuned to said first and second frequencies respectively and connecting the first and second current detectors respectively with the impedance means, a common output circuit connecting said current detectors so that the respective output currents are combined in opposition, a bistable transistor multivibrator having its input circuit connected in the output circuit of the detectors and switching from one stable state to the other when the polarity of the combined detector currents changes, a trigger pulse forming circuit connected with the output of the multivibrator to develop a trigger pulse for each switching of the multivibrator, a pulse generator connected with the output of the pulse forming circuit and developing a driving pulse corresponding to each trigger pulse, and a decoding device connected with the output of said pulse generator.

7. In a radio selective signaling system using call signals represented by permutations of a group of integers and encoded in a modulated carrier signal by alternating the modulating frequency thereof between first and second frequencies with closely spaced transitions to form an integer signal and with remotely spaced transitions to separate successive integer signals, a radio receiving station including a decoder circuit for translating said frequency transitions into electrical pulses, said decoder circuit including an impedance device adapted to receive the alternate frequency signal and develop a signal voltage corresponding thereto, a frequency selective detector having its input connected with the impedance device and developing an output signal of one polarity when the first modulating frequency predominates and of the other polarity when the second modulating frequency predominates, a trigger generator adapted to generate a trigger pulse each time its input signal polarity changes and reaches a predetermined amplitude, coupling means between the input of the trigger generator and said detector including time constant circuits for delaying the build-up of the detector output signal to said predetermined amplitude for a fractional part of the interval between said closely spaced transitions so that the trigger generator is responsive to the detector output signals produced by signal frequency transitions but is non-responsive to relatively short noise bursts, a pulse generator connected with the output of the trigger generator and developing a driving pulse corresponding to each trigger pulse, and a decoding device connected with the output of said pulse generator.

8. In a radio selective signaling system using call signals represented by permutations of a group of integers and encoded in a frequency modulated transmitted carrier signal by alternating the modulating frequency thereof between first and second tone frequencies with closely spaced tone frequency transitions to form an integer signal and with remotely spaced transitions to separate successive integer signals, a frequency modulation receiver including an audio output stage, a decoder circuit for translating said tone frequency transitions into electrical pulses, said decoder circuit including a coupling transformer having a primary winding connected across the audio output stage and having a secondary winding, a first frequency selective current detector including a first series resonant circuit and a first diode connected across said secondary winding, a second frequency selective current detector including a second series resonant circuit and a second diode connected across said secondary winding, a pair of smoothing inductors connected in series across the first and second diodes, the first and second series resonant circuits being tuned to said first and second tone frequencies respectively and said first and second diodes being oppositely poled across the secondary winding whereby the output voltages of said current detectors are combined in opposition to develop an output voltage, between the junction of the inductors and the junction of the diodes, of one polarity when the first tone frequency predominates and of the other polarity when the second tone frequency predominates, a condenser connected between said junctions to delay the build-up of output voltage when the first tone frequency predominates, a resistor connected across said second diode to delay the build-up of output voltage when the second tone frequency predominates, and a resistor connected across said first diode to obtain a desired balance of said current detectors, a bistable, transistor multivibrator having its input circuit connected across said junctions and switching from one stable state to the other when the polarity of said output voltage changes, a trigger pulse forming circuit connected with the output of the multivibrator to develop a trigger pulse for each switching of the multivibrator, and a pulse generator connected with the output of the pulse forming circuit and developing a driving pulse corresponding to each trigger pulse.

9. In a selective signaling system using call signals represented by permutations of a group of integers and encoded in a transmitted signal by alternating the frequency thereof between first and second frequencies with closely spaced transitions to form an integer signal and with remotely spaced transitions to separate successive integer signals, a receiving station including a signal device, an electromechanical decoding device having a stepping actuator and a decoding actuator, said decoding device being operative to control the signal device only when the stepping actuator is energized with a predetermined number of successive pulse trains with a predetermined number of pulses in each train and only when the decoding actuator is energized with a prolonged pulse continuing through each train of pulses, and a decoder circuit including a frequency selective detector adapted to receive the alternate frequency signal and develop an output signal of one polarity during reception of the first frequency and of the other polarity during reception of the second frequency, a bistable multivibrator having its input coupled with the detector output and switching from one stagle state to the other when the polarity of the input signal changes, a trigger pulse forming circuit connected with the output of the multivibrator to develop a trigger pulse for each frequency transition, a pulse generator connected with the output of the pulse forming circuit and developing a driving pulse corresponding to each frequency transition and of lesser duration than the interval between said closely spaced transitions, an integer signal channel connected between the pulse generator and the stepping actuator for energizing the stepping actuator with the driving pulses, a decoding pulse channel connected between the pulse generator and the decoding actuator and including means for storing each driving pulse longer than the interval between said closely spaced transitions but less than the interval between said remotely spaced transitions to develop a prolonged pulse continuing throughout each integer signal for energizing the decoding actuator.

10. In a selective signaling system using call signals represented by permutations of a group of integers and encoded in a transmitted signal by alternating the frequency thereof between first and second frequencies with closely spaced transitions to form an integer signal and with remotely spaced transitions to separate successive integer signals, a receiving station including a signal device, an electromechanical decoding device having a stepping actuator and a decoding actuator, said decoding devide being operative to control the signal device only when the stepping actuator is energized with a predetermined number of successive pulse trains with a predetermined number of pulses in each train and only when the decoding actuator is energized with a prolonged pulse continuing through each train of pulses, and a decoder circuit including a frequency selective detector adapted to receive the alternate frequency signal and develop an output signal of one polarity during reception of the first frequency and of the other polarity during reception of the second frequency, a bistable multivibrator having its input coupled with the detector output and switching from one stable state to the other when the polarity of the input signal changes, a trigger pulse forming circuit connected with the output of the multivibrator to develop a trigger pulse for each frequency transition, a monostable multivibrator including first and second switching transistors connected with the output of the pulse forming circuit and switching from its stable state to its unstable state in response to each trigger pulse and including a time constant circuit causing it to switch back to its stable state in a time interval less than that between said closely spaced transitions to generate a train of positive pulses at the first transistor and a train of negative pulses at the second transistor corresponding to each integer signal, an integer signal channel connected between the first transistor and the stepping actuator for energizing the stepping actuator with the driving pulses, a decoding pulse channel including a pulse inverter transistor connected with the second transistor of the monostable multivibrator, a storage condenser connected with the pulse inverter transistor and storing the positive pulses therefrom, a control transistor connected with said condenser and held cut-off by voltage stored thereby longer than the interval between said closely spaced transitions but less than the interval between said remotely spaced transitions, a switching transistor connected with said control transistor and held fully conductive thereby when the control transistor is cut-off to develop a prolonged pulse continuing throughout each integer signal for energizing the decoding actuator.

11. In a selective signaling system using call signals represented by permutations of a group of integers and encoded in a transmitted signal by alternating the frequency thereof between first and second frequencies with closely spaced transitions to form an integer signal and with remotely spaced transitions to separate successive integer signals, a receiving station including a decoder circuit including a frequency selective detector adapted to receive the alternate frequency signal and develop an output signal of one polarity during reception of the first frequency and of the other polarity during reception of the second frequency, a bistable multivibrator having its input coupled with the detector output and switching from one stable state to the other when the polarity of the input signal changes, a trigger pulse forming circuit connected with the output of the multivibrator to develop a trigger pulse for each frequency transition, a monostable multivibrator connected with the output of the pulse forming circuit and developing a driving pulse corresponding to each frequency transition and of lesser duration than the interval between said closely spaced transitions, an integer signal channel connected with the monostable multivibrator for developing stepping pulses, a decoding pulse channel connected with the monostable multivibrator and including means for storing each driving pulse longer than the interval between said closely spaced transitions but less than the interval between said remotely spaced transitions to develop a decoding pulse continuing throughout each integer signal, and a decoder connected with said integer signal channel and said decoding pulse channel for concurrent energization thereby.

12. In a selective signaling system using call signals represented by permutations of a group of integers and encoded in a transmitted signal by alternating the frequency thereof with closely spaced frequency transitions to form an integer signal and remotely spaced transitions to separate successive integer signals, a receiving station including a decoder means for controlling a signal device when a predetermined call signal is received, and a decoder circuit responsive to the transmitted signal and including integer signal means connected with the decoder means and developing an electrical pulse in response to each signal frequency transition, and including decoder pulse means connected with the decoding means and developing a prolonged pulse of duration of at least as long as the train of pulses forming an integer signal.

13. In a selective signaling system using call signals represented by permutations of a group of integers and encoded in a transmitted signal by alternating the frequency thereof with closely spaced frequency transitions to form an integer signal and remotely spaced transitions to separate successive integer signals, a receiving station including a signal device, an electromechanical decoding device having a stepping actuator and a decoding actuator, said decoding device being operative to control the signal device only when the stepping actuator is energized with successive pulse trains, each having a predetermined number of pulses and only when the decoding actuator is energized with a prolonged pulse continuing through each train of pulses, and a decoder circuit responsive to the transmitted signal and including integer signal means connected with the stepping actuator and developing an electrical pulse in response to each signal frequency transition, and including decoding pulse means connected with the decoding actuator and developing a prolonged pulse of duration at least as long as the train of pulses forming an integer signal.

References Cited in the file of this patent

UNITED STATES PATENTS

| | | |
|---|---|---|
| 2,568,408 | Peterson | Sept. 18, 1951 |
| 2,595,614 | Stickel | May 6, 1952 |
| 2,871,463 | Beckwith | Jan. 27, 1959 |
| 2,912,574 | Gensel | Nov. 10, 1959 |
| 2,947,974 | Stickel | Aug. 2, 1960 |